Dec. 30, 1952  J. C. NEWTON  2,623,715
TURN CONTROL APPARATUS
Filed Nov. 14, 1947
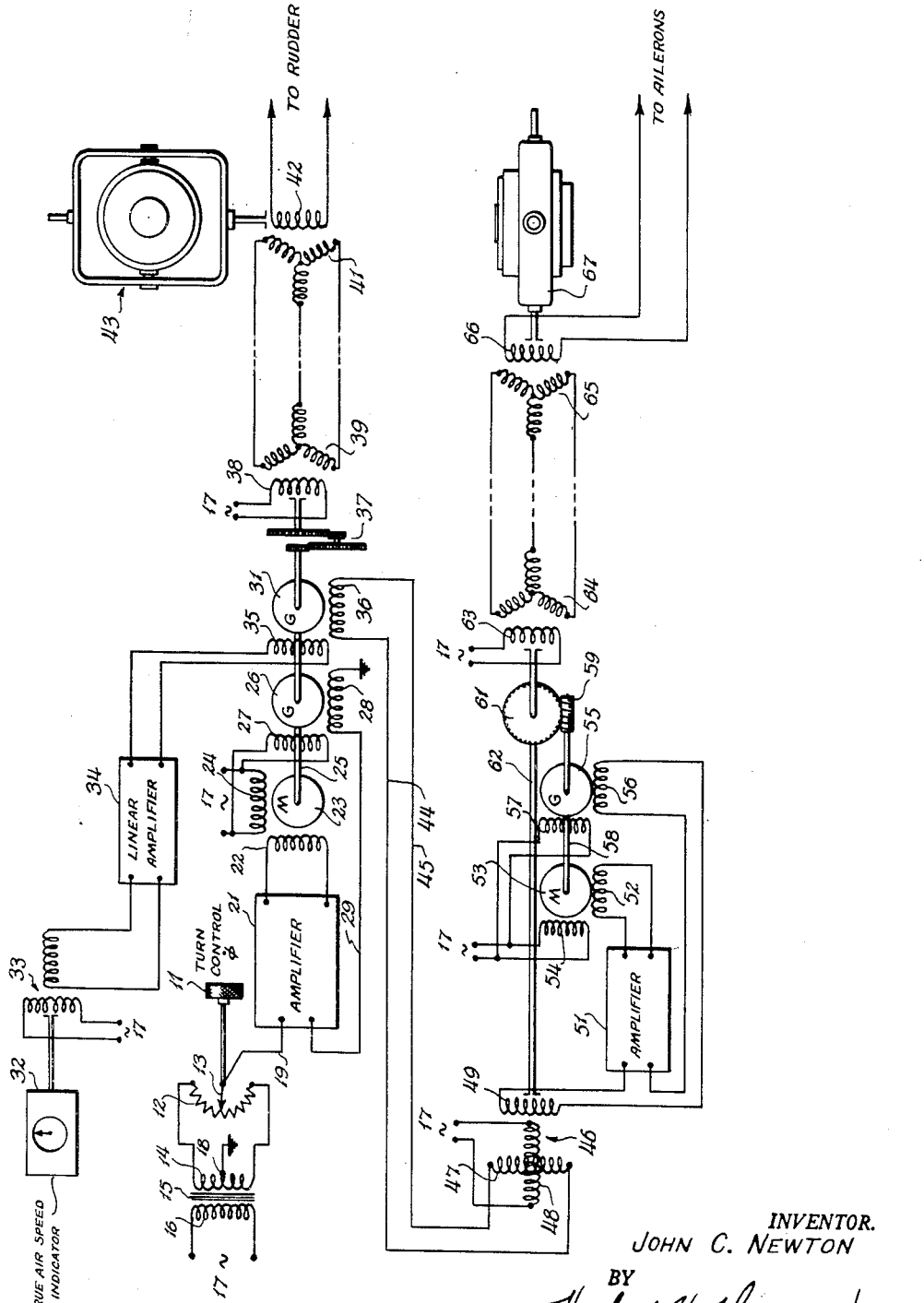
INVENTOR.
JOHN C. NEWTON
BY
Herbert H. Thompson
his ATTORNEY.

Patented Dec. 30, 1952

2,623,715

UNITED STATES PATENT OFFICE 2,623,715

TURN CONTROL APPARATUS

John C. Newton, New York, N. Y., assignor to The Sperry Corporation, a corporation of Delaware Application November 14, 1947, Serial No. 785,850

7 Claims. (Cl. 244—77)

This invention relates to automatic flight control apparatus for aircraft, and particularly concerns a turn control device for entering a craft into a predetermined rate of turn while simultaneously maintaining the craft at a bank angle that is proper for that predetermined rate of turn.

More particularly and in accordance with the instant invention, a turn control device is provided for automatically maintaining a craft at a bank angle that is computed in accordance with the equation $$\theta_B = \tan^{-1}\left(\frac{\dot{\phi} V}{g}\right)$$

where $\theta_B$ is the bank angle; $\dot{\phi}$ is the predetermined rate of turn; $V$ is the true airspeed of the craft; and $g$ is the acceleration of gravity. The turn control of the present invention includes a true air speed measuring device having associated therewith pick-off means for providing a signal that is responsive to the true air speed of the craft. A turn control device is also provided and includes a knob that is settable in accordance with desired craft rate of turn. Signal generating apparatus associated with the knob is capable of producing a signal proportional to the knob displacement and having a phase sense that is in accordance with the direction of the desired turn. A computing mechanism having an output proportional to the product of the true air speed signal times the rate of turn signal is provided and a tangential computer is arranged to receive this computed product and to thereupon produce an output proportional to the tangent of said product. A signal proportional to the output from the tangential computer may then be compared with the actual angle of bank of the craft and if there is a discrepancy between the signals, means for appropriately altering the angle of bank is provided.

The device of the instant invention is particularly adaptable for use in high speed craft that are maneuverable into extreme attitudes. Further, to afford completely automatic flight control for high speed aircraft, the turn control device set forth herein may be supplemented by an automatic flight control device such as is disclosed in copending U. S. application Serial No. 734,922, filed on March 15, 1947 by John Slater and Walter Wrigley, entitled "Flight Control Systems," and assigned to the assignee of the instant invention. The operation of an alternative form of the turn control device of the present application, in conjunction with a new flight control system, is fully disclosed in the above-referred to copending application.

A primary object of this invention is to provide a turn control device that will operate to enter and maintain a craft into a predetermined rate of turn without side slip or skid.

A still further object is to provide a turn control device operative to control a craft while in turns requiring large bank angles.

These and other objects will become apparent from the specification, taken in connection with the accompanying drawing wherein, a schematic diagram of an embodiment of the instant invention as applied to a turn control apparatus is illustrated.

In the drawing, a turn control knob 11 is arranged in a craft (not shown) to be set in accordance with the rate of turn desired. The rate of turn knob 11 is operatively associated with a controller such as a potentiometer 12 in a manner whereby the slider 13 is positionable on the potentiometer 12 in accordance with rotation of the knob 11. The potentiometer 12 is also connected across the secondary winding 14 of a transformer 15. The primary winding 16 of the transformer 15 is energized by a suitable alternating current source 17. Center tap 18 of the secondary winding 14 is connected to ground. With the circuit described, a voltage with respect to ground may be produced in the line 19 and this voltage will be equal to zero if the rate of turn knob 11 positions the slider 13 in a midposition. In the event the slider 13 is displaced to either side of the midpoint, a voltage that is proportional to that displacement and of a phase sense responsive to the direction of the displacement, will be produced and transmitted by the line 19 to the linear amplifier 21. The amplifier 21 may be of any conventional design, and has an output that is supplied to the field winding 22 of a two phase motor 23, the other phase 24 of the motor 23 being energized by the voltage source 17. An amplified voltage, emanating from the amplifier 21 in response to a displacement from a midpoint position of the slider 13 on the potentiometer 12, will cause the motor 23 to rotate with a speed that is proportional to that displacement.

An anticipator generator 26 is provided with one field winding 27 energized by the voltage source 17, and a space-quadraturely related field winding 28 so connected as to modify the input voltage supplied to the amplifier 21. Motor 23 and generator 26 have their rotors connected by the shaft 25. When motor 23 is energized and thereby caused to rotate, the rotor of generator 26 will also be caused to rotate and will generate in winding 28 a voltage directly proportional to the rotor speed, the voltage of source 17 remaining constant. Line 29 completes the circuit from ground through winding 28 to the input connection of amplifier 21. The voltage appearing at the input terminals of the amplifier then will be the algebraic sum of that supplied by potentiometer 12 and winding 28. The generator voltage is supplied in bucking relation to the potentiometer voltage and hence the motor speed is proportional to the difference between the potentiometer voltage and the generator voltage. Therefore, the turn control knob 11 may be adjusted to provide a voltage from potentiometer 12 that will drive motor 23 at a desired rate and the feed-back voltage from generator 26 will maintain the motor at the desired rate. In other words, should the motor speed for some reason or other exceed a value proportional to the potentiometer setting, then the generator voltage will increase and the resultant voltage input to amplifier 21 will be decreased causing the motor to decelerate. Similarly, should the motor speed drop off, the generator voltage will decrease thereby increasing the resultant voltage input to amplifier 21 thereby producing an acceleration of the motor. The motor speed will therefore be maintained proportional to the value set by turn control knob 11.

The shaft 25 extends to rotate the rotor of generator 31 to conform with the rotation of motor 23 and generator 26. The generator 31 is provided with two quadraturely related field windings 35 and 36, one of which is energized from an external source. More particularly, the winding 35 is arranged to receive the output signal from the linear amplifier 34. The signal input to the amplifier 34 is produced in the signal generator generally identified at 33, which produces a signal output that is proportional to the craft true airspeed as determined by the true airspeed instrument 32.

By virtue of the elements heretofore described, generator 31 has one field winding 35 energized by a voltage that is proportional to true airspeed, and the rotor of generator 31 is rotated at a speed that is proportional to the craft rate of turn as predetermined by the setting of knob 11. Thusly, generator 31 serves as a computing means, a voltage being induced in the field winding 36 which voltage will be proportional to the product of craft rate of turn and craft true airspeed.

The generator 31 being arranged to drive the reduction gear 37 through a continuation of shaft 25, will thereupon cause the winding 38 of selsyn 39 to rotate at a speed that is proportional to predetermined craft rate of turn. The selsyn 41, arranged to have its field windings in circuit with the field windings of selsyn 39, is additionally provided with a rotor winding 42 that is positioned in rotation by the displacement in azimuth of the directional reference, which in this instance is the directional gyro 43. Selsyns 39 and 41, therefore, form a data transmission system, that is, they function to compare the angular positions of the rotors thereof. Thusly, upon disagreement in rotational displacement of rotor 42 with respect to rotor 38, a signal will be generated in rotor 42 that is proportional to that disagreement, and this signal may be supplied to rudder control mechanisms (not shown herein, for such mechanisms are well known in the art) to thereby displace the rudder to produce the craft rate of turn desired. When the craft is caused to turn at the desired rate, the reference device or directional gyro 43 will cause the rotor 42 to turn at a rate that will be in agreement with the rate at which the rotor 38 is turning, and the signal supplied to the rudder will then reduce to zero.

The signal voltage generated in the winding 36 of generator 31, that is proportional to the product of true craft airspeed and craft rate of turn, is transmitted by the lines 44, 45 as an input to the rotary transformer 46. More particularly the signal serves to energize the winding 47 of a two field transformer 46, the other field transformer 48 being arranged to be in quadrature relation to the field 47, and field 48, also being constantly energized by the voltage source 17. By the arrangement described, the combined fields of the rotary transformer 46 will produce a field having a resultant component with a vector angular position dependent upon the value of the voltage supplied to the winding 47 by the computer-generator 31. The rotor 49 of the rotary transformer 46 will have induced therein, a voltage which will be a function of the angle between the position of the rotor 49 and the resultant vector of the voltages in the field windings 47 and 48. The voltage induced in rotor 49 is then transmitted as an input to an amplifier 51. The amplified output from amplifier 51 serves to energize one winding 52 of a motor 53, the motor having a second field winding 54 arranged in quadrature relation to the winding 52 and energized by the voltage source 17. An anticipator generator 55 is provided having its rotor driven by the motor 53 through shaft 58, and having two quadraturely related field windings 56 and 57. The voltage induced in winding 56 (by virtue of the rotation imparted to its rotor by the motor 53, and the constantly energized field winding 57), is supplied to the input of amplifier 51 as a damping voltage, improving the smoothness with which the equipment aligns rotor 49 to the angular position established by the vector resultant of the voltages in field windings 47 and 48.

Shaft 58 is further extended to rotate the worm gear 59 to thereby drive the gear 61 and the drive shaft 62 which is mounted to rotate therewith. The rotor winding 49, is positioned in rotation by the drive shaft 62, and the position to which the winding 49 will be rotated will be that at which zero voltage is induced in the winding 49 by the vector resultant of the excitation of windings 47 and 48. During straight flight, with turn knob 11 in the neutral or zero output position, rotor winding 49 will be aligned to zero induction from the excitation of winding 48 only, since in this condition winding 47 will have no excitation supplied to it.

Since the excitation of winding 48 is constant in direction and amplitude, and since the excitation of winding 47 is perpendicular to that from winding 48 and proportional to the product of craft true air speed times rate of turn, the vector sum of the two excitations will be displaced from the excitation of winding 48 alone by an angle whose tangent is proportional to the product of turn rate and true air speed. By proper choice of equipment constants this proportionality factor may be made unity. Rotor winding 49, then, when kept aligned to zero induction from the resultant excitation vector will be maintained at the angle of a correctly banked turn.

In order to enter the craft into the bank angle, as computed in the above-described manner, a rotor 63 of a selsyn 64 (or telegon or other remote indicating system well known to the art) is associated with shaft 62 to be positioned in rotation thereby. A similar selsyn unit 65 is provided with a rotor 66 mounted to be positioned in rotation in accordance with actual craft bank angle, as may be determined, in this instance, by the vertical gyro 67. Selsyns 64 and 65 form a data transmission system, that is, they function to compare the angular positions of the rotors thereof. Thus, upon the occurrence of a displacement of the rotor coil 63, as in response to a rate of turn signal, this displacement of coil 63 relative to coil 66 will cause a signal to be created in coil 66, which signal will be proportional to that relative displacement. A conventional aileron control mechanism (not shown) may then be employed to cause the craft ailerons to be displaced to thereby enter the craft into an actual bank angle that is in conformance with the computed bank angle.

In order to avoid the effect of craft bank on the signal sent to the rudder control mechanism, it would be necessary to either provide some method of stabilizing the directional gyro 43, or to provide some apparatus to compensate for the difference between the true vertical and the vertical axis of the gyro 43 during condition of bank. For example if the gyro 43 were left unstabilized, or was not compensated during conditions of extreme craft bank, the rate of turn would be approximately 100% erroneous for bank angles of 60°. Therefore, to avoid this source of error, which source is sometimes referred to as "gimbal error," the vertical gyro 67 may be used to provide a stabilized reference for the directional gyro 43, or alternatively any system for compensating the signal supplied to the rudder control mechanism in accordance with craft bank angle may be employed. By thusly stabilizing the directional gyro, or otherwise compensating for the difference between true vertical and craft vertical during a bank condition, these discrepancies may be avoided and proper rate of turn signals will be sent to the rudder control means notwithstanding extreme bank angles of the craft. The stabilization of the directional reference is not new in this application, a directional reference being shown stabilized by a vertical gyro in the aforementioned Slater-Wrigley application.

Since many changes could be made in the above construction and many widely different embodiments of this invention could be made without departure from the scope thereof, it is intended that all matter contained in the above description or shown in the accompanying drawings shall be interpreted as illustrative and not in a limiting sense.

What is claimed is:

1. A turn control apparatus for dirigible craft having means for banking and means for altering craft flight path comprising settable means for producing a first signal proportional to desired rate of turn, an azimuthal reference device having a signal generating means associated therewith for supplying rate of turn information to flight path controlling means, an airspeed device having a signal generating device with an output proportional to true airspeed, a first computing means arranged to receive the true airspeed signal and the craft rate of turn signal and having means therein for computing output signals proportional to the product of said true airspeed and rate of turn, a second computing means having an output responsive to the tangential function of said product, and a vertical reference device having associated therewith signal producing means for supplying craft angle of bank information to craft banking means in accordance with the output of said second computing means.

2. A turn control apparatus for dirigible craft having mechanisms for causing the craft to bank and for altering craft flight path comprising a first device displaceable in accordance with craft true airspeed, a second device displaceable in accordance with predetermined craft rate of turn, a computing device for determining a quantity proportional to the angle whose tangent is proportional to the product of displacements produced by said first and second devices, means for supplying rate of turn information to craft flight path control mechanisms to control craft rate of turn thereby, and means for supplying the computed angle information to craft bank angle control mechanisms for controlling craft bank angle thereby.

3. A turn control apparatus for a dirigible craft comprising a first signal producing means having an output proportional to predetermined craft rate of turn, a second signal producing means having an output proportional to craft true air speed, first computing means having an output proportional to the product of outputs from said first and second signal producing means, second computing means having an output proportional to a tangential function of the output from said first computing means, control means for establishing a craft bank angle in accordance with the output from said second computing means, and means for establishing craft rate of turn in accordance with the output from said first signal producing means.

4. In an automatic flight control system for dirigible craft having rudder and ailerons and operating mechanisms therefor, means for producing a signal proportional to a desired rate of turn, means for producing a signal proportional to air speed, multiplier means to which both of said signals are supplied for providing an output proportional to the product of said signals, means for controlling the rudder operating mechanism so that the craft rate of turn matches the rate of turn signal employed in said multiplier, means for computing the angle whose tangent is proportional to the output of said multiplier, and means for controlling the aileron operating mechanism so as to produce a craft bank angle equal to said computed angle.

5. In an automatic flight control system for dirigible craft having a rudder and ailerons and operating mechanisms therefor, means for producing a signal voltage proportional to a desired rate of turn, means for producing a signal voltage proportional to air speed, multiplier means comprising a motor and a generator driven thereby, means for controlling said motor to drive at a rate proportional to the rate of turn signal voltage, means for controlling the rudder operating mechanism so that the craft rate of turn matches the angular velocity of said motor, means for exciting the field winding of said generator with said air speed signal voltage whereby the output of said generator is proportional to the product of said two signal voltages, and means for controlling the aileron operating mechanism so that the craft bank angle is dependent upon the output of said generator.

6. In an automatic flight control system for dirigible craft having rudder and ailerons and operating mechanisms therefor, means for producing a signal voltage proportional to a desired rate of turn, means for producing a signal voltage proportional to air speed, a motor and means for controlling said motor to drive at a rate proportional to the rate of turn signal voltage, means for controlling the rudder operating mechanism so that the craft rate of turn matches the angular velocity of said motor, multiplier means for supplying an output proportional to the product of said signal voltages, means for computing the angle whose tangent is proportional to the output of said multiplier, and means for controlling the aileron operating mechanism so as to produce a craft bank angle equal to said computed angle.

7. In an automatic flight control system for dirigible craft having rudder and ailerons and operating mechanisms therefor, means for producing a signal proportional to a desired rate of turn, means for producing a signal proportional to air speed, a motor and means for controlling the speed of said motor in accordance with said rate of turn signal voltage, an azimuth reference device, a data transmission system including one selsyn-like unit having its rotor driven by said motor and another selsyn-like unit having its rotor positioned by said azimuth reference device, said system being adapted to produce a signal proportional to relative displacement between the rotors of said selsyn-like units, means for controlling the rudder operating mechanism in accordance with the signal output of said data transmission system, a generator driven by said motor and having its field winding energized by said air speed signal voltage, said generator being adapted to supply an output proportional to the product of the rate of turn voltage and the air speed voltage, computing means supplied with the output of said generator for computing the angle whose tangent is proportional to the output of said generator, a gyro vertical, a second data transmission system comprising one selsyn-like unit having its rotor positioned in accordance with the output of said computing means and a second selsyn-like unit having its rotor positioned by said gyro vertical about its roll axis, said second system being adapted to produce a signal output proportional to relative displacement between the rotors of said selsyn-like units, and means for controlling the aileron operating mechanism in accordance with the signal output of said second data transmission system.

JOHN C. NEWTON.

REFERENCES CITED

The following references are of record in the file of this patent:

UNITED STATES PATENTS

| Number | Name | Date |
|---|---|---|
| 2,137,974 | Fischel | Nov. 22, 1938 |
| 2,162,862 | Protzen | June 20, 1939 |
| 2,190,390 | Thiry | Feb. 13, 1940 |
| 2,423,337 | Moseley | July 1, 1947 |